Figure 3:
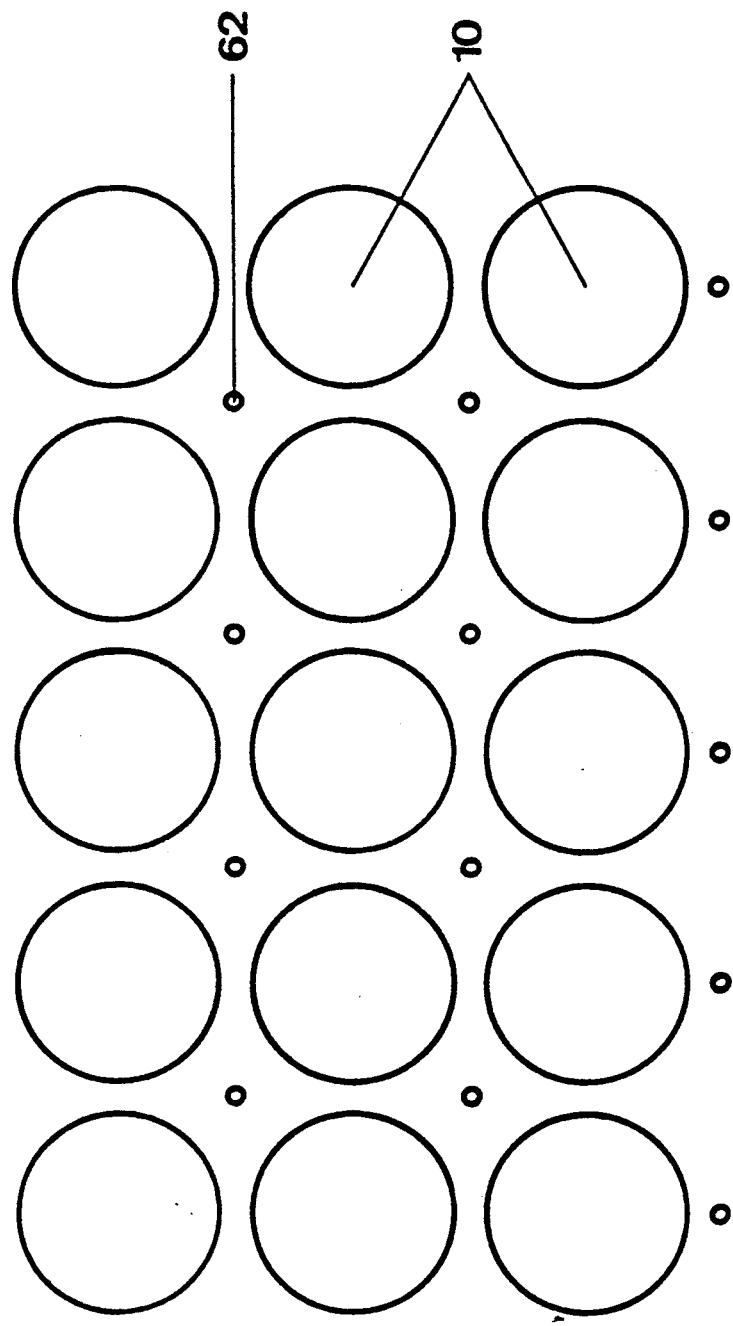

United States Patent [19]

Reznik

[11] Patent Number: 5,042,520

[45] Date of Patent: Aug. 27, 1991

[54] PROTECTIVE DEVICE FOR GAS PRESSURE VESSELS

[75] Inventor: Israel Reznik, Zollikon, Switzerland

[73] Assignee: Alusuisse-Lonza Services Ltd., Zurich, Switzerland

[21] Appl. No.: 533,097

[22] Filed: Jun. 14, 1990

[30] Foreign Application Priority Data

Aug. 8, 1989 [CH] Switzerland .................... 2915/89

[51] Int. Cl.⁵ ..................... F16K 17/38; F16K 17/40
[52] U.S. Cl. .................................... 137/79; 137/72
[58] Field of Search ................. 137/79, 72; 169/61, 169/66; 236/78 B, 92 C

[56] References Cited

U.S. PATENT DOCUMENTS

| 1,539,667 | 5/1925 | Halagarda | 137/79 |
| 2,687,618 | 8/1954 | Bergstrom | 169/66 X |
| 2,829,720 | 4/1958 | Heigis et al. | 137/79 X |
| 2,968,161 | 1/1961 | Bliss | 137/79 X |
| 3,993,138 | 11/1976 | Stevens et al. | 169/61 |

FOREIGN PATENT DOCUMENTS 3103646 8/1982 Fed. Rep. of Germany .

Primary Examiner—John Rivell
Attorney, Agent, or Firm—Bachman & LaPointe

[57] ABSTRACT

The protective device prevents overheating, in particular by fire, of individual or batteries of pressure vessels of length equal to at least 1,5 m, employed for storage and/or transportation of gases under high pressure. The essentially cylindrical pressure vessels have at least one closure cap with a valve or a closure plug. Mounted on one closure cap is a pressure pipe which communicates with the interior of the pressure vessel, and is fitted with a controllable venting valve that under normal conditions closes off the pressure pipe or a common pressure pipe and has a venting pipe which terminates outwith the region of the pressrue vessel/vessels. Temperature sensitive actuating means are provdied in the axial direciton of the pressure vessel/vessels a spacing apart and connected to the venting valve. These means can individually actuate the venting valve should overheating occur.

19 Claims, 4 Drawing Sheets

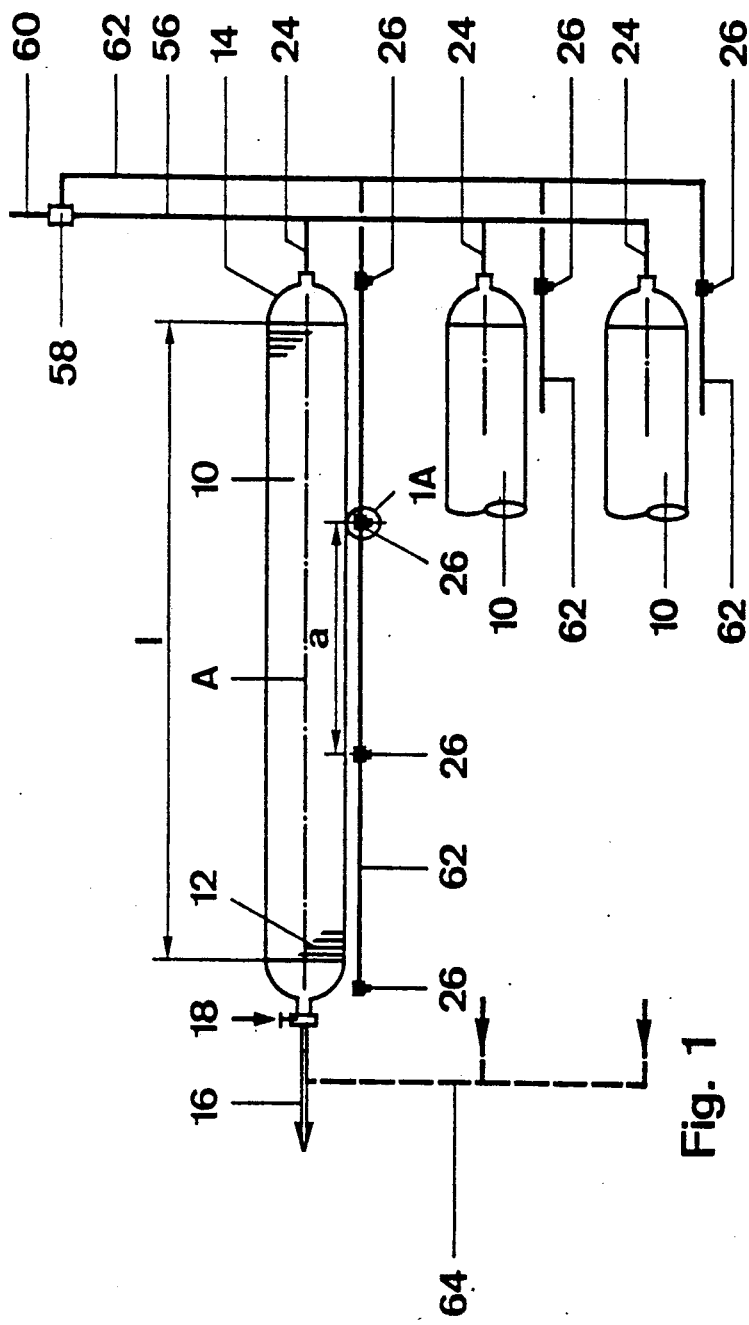
Fig. 1
Fig. 1A
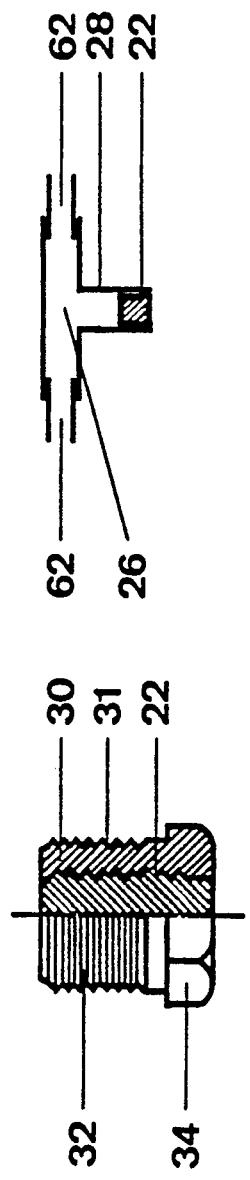
Fig. 2

PROTECTIVE DEVICE FOR GAS PRESSURE VESSELS

The invention relates to a protective device for protecting individual pressure vessels of at least 1,5 m in length, or batteries thereof, against overheating in particular by fire, said pressure vessels being for the transportation of high-pressure gases and being essentially cylindrical with at least one end cap with a valve or an end plug. Furthermore, the invention relates to the use of the protective device for special gas pressure vessels.

Pressure vessels have long since been protected against overpressure produced by heat development. This takes place for example by the installation of a rupture disc of known design, which ruptures in the event of a critical pressure and allows the gas to escape.

Furthermore, it is also known to replace a rupture disc by a melting plug of an alloy melting at a low temperature. These alloys are also referred to as Wood's metal.

If the temperature increases due to general or local overheating in the area of the melting plug to a predetermined temperature, dependent on the alloy composition, the metal melts and the gas can escape from the pressure vessel. Usually, alloys having a melting point of 80°-120° C. are used for melting plugs.

For the storage and transportation of gases in cylindrical pressure vessels with high internal pressure, recently very large gas cylinders of diameters up to approximately 600 mm, in particular 550 mm, and lengths of 6 or even 12-13 m have also been produced. These large pressure vessels, when filled, have in practice an operating pressure of over 200 bar.

Large pressure vessels of steel have the disadvantage that they have a very high empty weight. Therefore, due to their lower weight, pressure vessels of aluminum are used in particular for transportation. As described in DE-C2 3103646, pressure vessels of aluminum can also be produced with reduced wall thickness. The areas of reduced wall thickness must, however, be fiber-reinforced, for example by glass fibers bound in a flame retardant polymer matrix.

Large pressure vessels of the said type have end caps at both ends, on to which a valve or an end plug can be connected in each case. If a melting plug is integrated, as soon as a temperature in the range of approximately 100° C. is exceeded, it melts and flows out. Thereafter, the gas stored in the pressure vessel can escape without any appreciable resistance.

What is unsatisfactory is the fact that an outbreak of fire or other local heating in the middle area of a large pressure vessel can cause a damaging effect before at least one of the end melting plugs has melted and the gas of the pressure vessel can escape. The heat development in the middle area can progress to the extent that the pressure vessel may already burst before the opening of the melting plugs, even if it has already been emptied to a great extent. This danger exists primarily in the case of pressure vessels of aluminum.

The inventor has set himself the object of creating a protective device for a pressure vessel or battery of pressure vessels of the type mentioned at the beginning which reduces to a negligible minimum the risks of overheating, in particular of the effect of a fire, irrespective of the length, the diameter and the filling pressure of a cylindrical pressure vessel. The protective device is to be inexpensive in production, simple in its operation and of enhanced safety. Furthermore, the protective device mentioned is to be suitable for universal use.

According to the invention, the object is achieved with respect to the device by the fact that a pressure pipe communicating with the interior of the pressure vessel, branches off from an end cap and is provided with a venting valve that can be regulated, is situated away from the pressure vessel/vessels and, in its normal setting, closes off the pressure pipe or a common pressure pipe and features a venting pipe that terminates away from the region of the pressure vessel/vessels and temperature-sensitive actuating means are provided spaced apart in the axial direction of the pressure vessel/vessels and connect to the venting valve, said means being such that each individual means, if overheated, can actuate the venting valve.

The means for actuating the venting valve are preferably situated in the region of both ends of the pressure vessel/vessels and in the axial direction thereof at regular intervals of 1-2 m. In practice it has been shown to be particularly favorable to employ intervals of about 1,5 m.

The venting valve is situated outside the region of greatest heat development in the case of fire, this in order that it is not damaged and prevented from operating property.

In the case of a pressure vessel containing a noncombustible gas such as, for example, helium, argon, nitrogen or carbon dioxide, this can be vented directly from the venting valve into the atmosphere.

On the other hand in the case of fire-promoting gases such as, for example, natural gas, cooking gas, oxygen, methane or hydrogen, it is advantageous to connect a venting pipe to the venting valve. This leads the escaping combustible gas completely away from the region of the pressure vessel/vessels and allows it to escape to the atmosphere, for example above the roof of a tube-trailer or outside a room containing a battery of pressure vessels. The large volumes of escaping gas can therefore neither fuel a fire nor spread it.

If a plurality of pressure vessels is combined in a rack for the storage or transportation of gases, for example 3×4 or 4×3 pressure vessels, one refers to a battery of pressure vessels. In such a battery each pressure vessel can have a separate pressure pipe with a venting valve and actuating means. In most cases, however, it is more economic and technically simpler to connect the pressure pipes all together or in groups to one or more common pressure pipes each of which has a venting valve and expediently a correspondingly larger nominal width. The common venting valve/valves can be actuated individually by each corresponding actuating means. Thus, within the shortest time, one single actuating means can also vent all or a group of pressure vessels into a region away from the danger zone by actuating the venting valve.

The means for actuating the venting valve can, in turn, be arranged in the longitudinal direction below each individual pressure vessel. In the case of a battery of pressure vessels they can, however, at least to some extent also be situated in the region between the pressure vessels, as a result of which their responsiveness is improved. On vehicles, where any possible harmful heat development is practically only from below, the arrangement of actuating means can be limited to the simplest version viz., to positioning in the space between the lowest-lying pressure vessels.

The diameter of pressure pipes is, depending on the volumes of gas to be vented, preferably in the range of 5 to 15 mm. Pressure pipes must not only withstand the same pressure as the pressure vessels, they must also not lose their strength at elevated temperatures. Materials that come into question for the pressure pipes are therefore in the first instance steel, copper and brass.

According to a first version of the invention the temperature-sensitive actuating means comprise at least one low pressure pipe running in the axial direction with, built-in at intervals, essentially T-shaped fittings that have in their branching-off leg a melting plug of an alloy which melts at a low temperature.

The alloy of the melting plug, known per se but according to the invention additionally arranged in a pressure pipe, preferably melts in a range of approximately 80°-120° C., in particular at approximately 100° C. The melting temperature must not be too low, as otherwise the metal could melt without a dangerous situation existing, for example due to intensive sunlight in southern countries. On the other hand, the melting temperature must not be too high, because otherwise a damaging effect cannot be ruled out with adequate certainty.

The low pressure pipe is closed at one end and at the other end connected to a pneumatic venting valve which, under normal conditions, it keeps closed without loss of pressure. The low pressure pipe is preferably filled with a favorably priced gas that is at least in part non-combustible and is non-corrosive, and such that a pressure of usefully 3-15 bar, in particular 6-8 bar is maintained. Particularly suitable for this is nitrogen, but, + giving due regard to safety measures, * also compressed air.

As the capacity of one or more communicating, interconnecting low pressure pipes is relatively low, and in the case of a slight leak could result in a critical pressure drop, the low pressure pipe is preferably connected to a reservoir.

This way the capacity is significantly raised, and compensation can be made for any small leaks. The reservoir is usefully a gas bottle of a few liters capacity containing the gas in question under pressure. The low pressure pipe can, however, also be connected to the compressed air system of the vehicle or to a storage building, in such a case, however, a drop in pressure that would occur on switching off the compressor being prevented by an appropriate valve.

If as a result of the development of heat, at least one melting plug on the low pressure pipe melts, then the pressure drops immediately and the venting valve, + preferably a ball valve with an automatic control head, + opens the pressure line of the pressure vessel/vessels within seconds and the gas in the pressure vessel/vessels can escape.

In the case of a low pressure pipe filled with nitrogen or another non-combustible gas the contents of the pipe can escape into the fire without any problems. Also compressed air in the low pressure pipeline has only a negligible influence on the fire. If a compressed air compressor is connected up to the low pressure pipeline, then there is preferably a pipe of greatly reduced cross section inserted there, for example in the form of a nozzle opening or a capillary tube. This small inlet, in practice much less than 1 mm², is completely sufficient to maintain the gas pressure in the low pressure pipeline also in the presence of a small leak. In the case of damage on the other hand only little air flows into the fire.

According to a second version of the invention the temperature sensitive means of actuating the venting valve comprises at least one pair of heat-resistant, electrically conductive wires with thermosensors that are arranged in the axial direction and transmit an electrical signal at a given temperature. These are connected to the venting valve which is in the form of an electric servo-valve that, under normal operating conditions, is closed off by spring pressure.

In accordance with standard electronics practice, a relay is provided in the conductive path from a thermosensor to the venting valve, in response to a signal this relay releases a current from a power source that is always switched on, the said current opening the servo-valve against the resistance offered by a spring. In practice the relay closes an electric circuit connected to the battery of the vehicle transporting the pressure vessels or to a battery in a building for storing the pressure vessels. The battery current switched on the relay is sufficient to overcome the closing action of the spring in the servo-valve.

The conductor wires with the thermosensors are arranged parallel to the longitudinal direction of the pressure vessel/vessels, or wound spirally around one or individually around a plurality of pressure vessels. On winding the wire the length of the conductor wire must be of such a dimension that the thermosensors are arranged approximately parallel to the pressure vessel/vessels and are situated below the same.

In accordance with the melting plugs, the thermosensors respond to a temperature of about 100° C. and emit an electrical signal.

The main use for the protective device according to the invention is with pressure vessels of aluminum, in particular such with a fiber-reinforced jacketing.

Standardized pressure vessels for natural gas, such as are employed in particular in English speaking regions, have a length of about 6 m (20 ft) and a diameter of about 550 mm. Full pressure vessels have an operating pressure of about 210 bar (3000 psi). The vessels are tested under pressure, without the action of heat; rupture occurs at about 600 bar.

Transportation of the pressure vessels takes place in tube-trailers that are loaded with a battery or batteries of pressure vessels. The essential advantage of the device according to the invention for protecting individual or batteries of pressure vessels is that local overheating, in particular fire can occur anywhere, also in the region of the mid-length of the pressure vessel or battery thereof. Within a short time the closest lying actuating means, whether melting plug or a thermosensor, is activated when the temperature reaches about 100° C.; the venting valve is opened within seconds and the gas in one or all of the pressure vessels can escape under any prevailing pressure conditions and eliminate pressure built up as a result of heating, before the pressure vessel can burst. The protective device operates therefore independent of how full the vessel is, and always conducts the gas into a region away from the danger zone.

The invention is explained in the following with the aid of exemplified embodiments which are also objects that are dependent on the patent claims and are shown schematically in the drawing viz.

Figure 4:
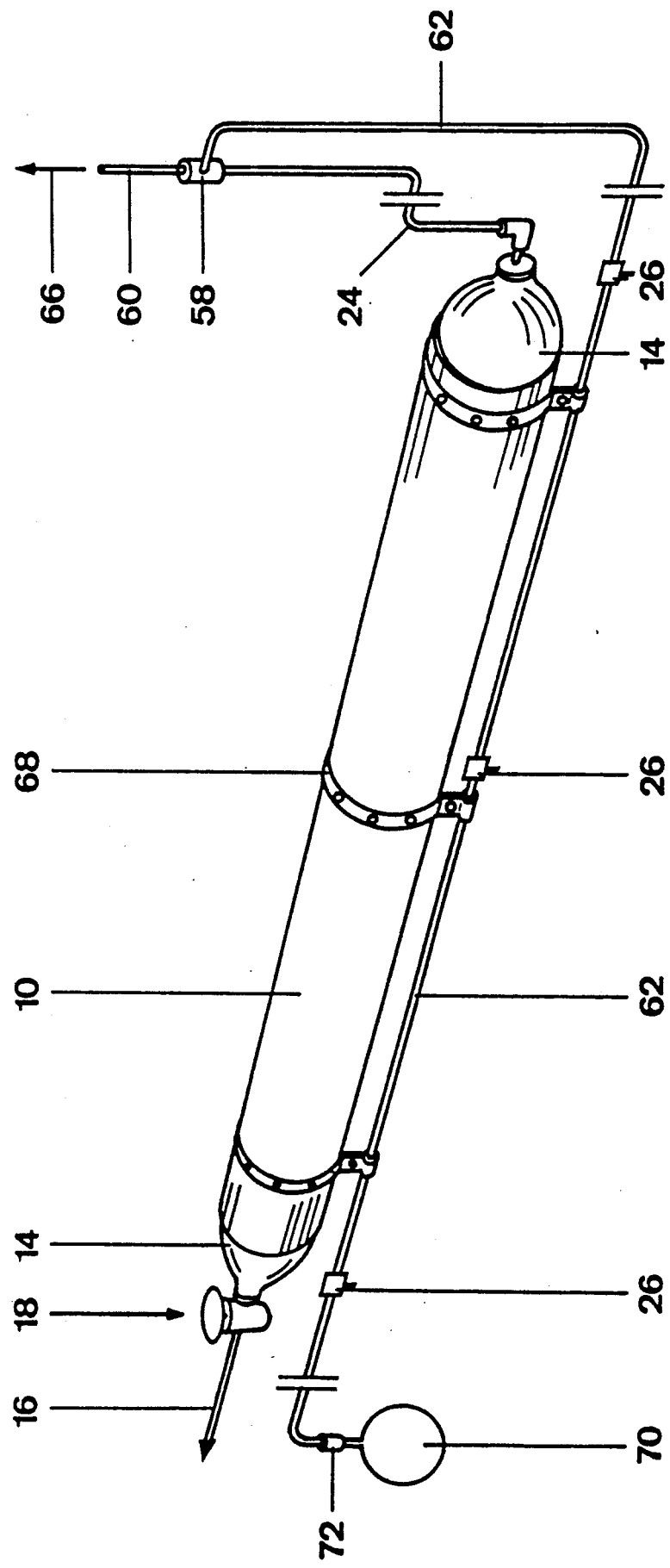
Figure 5:
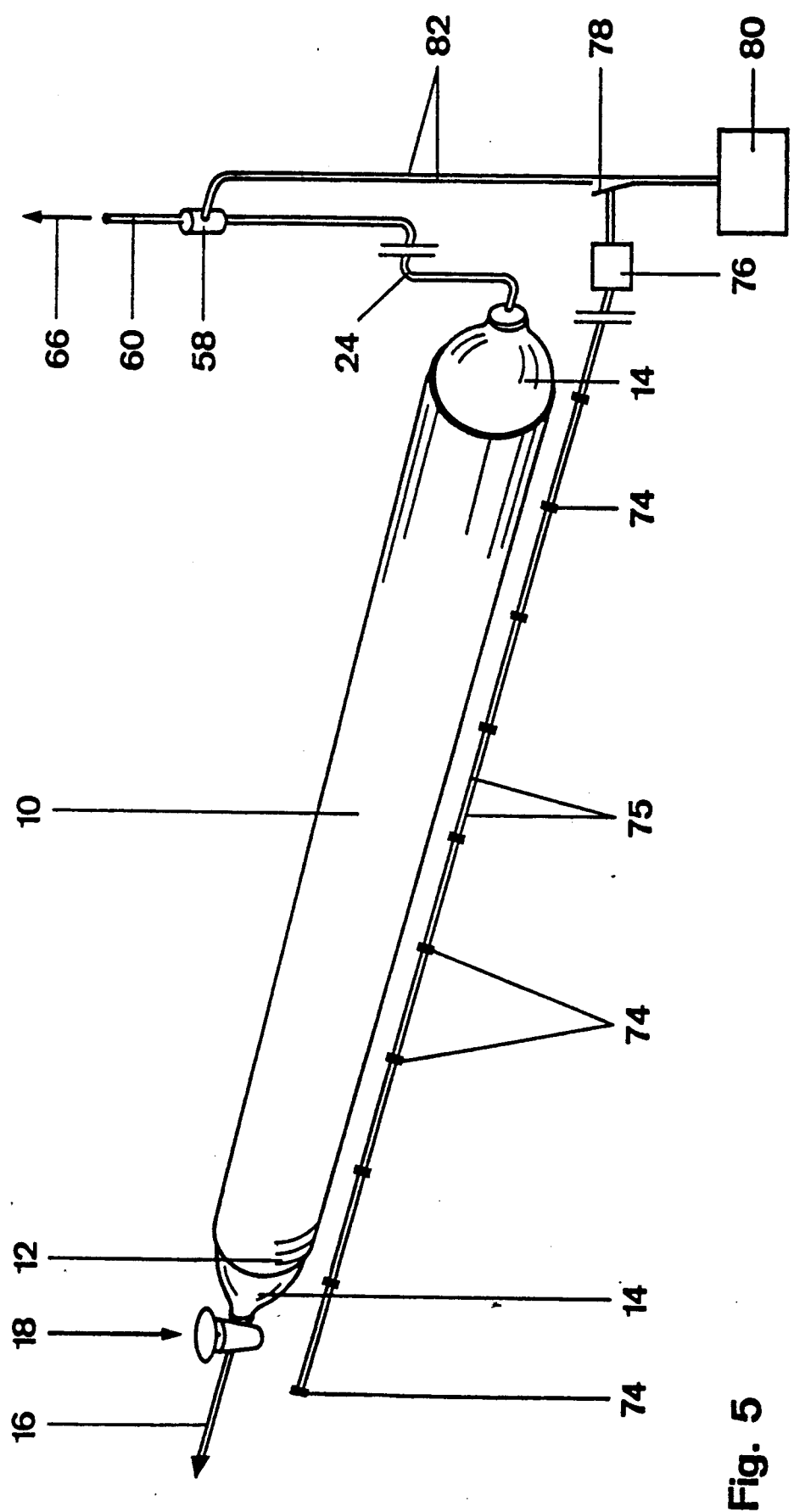

FIG. 1 shows a view of a cylindrical pressure vessel with a protective device, and further pressure vessels indicated there;

FIG. 1A a detail of FIG. 1;

FIG. 2 a longitudinal section through a melting plug known per se;

FIG. 3 a cross-section through a battery of cylindrical pressure vessels with low pressure pipes;

FIG. 4 a perspective view of a cylindrical pressure vessel with a low pressure pipeline;

FIG. 5 a perspective view of a cylindrical pressure vessel with thermosensor.

The cylindrical pressure vessel represented in FIG. 1 serves for the storage and/or transportation of a high-pressure gas. The vessel of aluminum is reinforced with glass fibers 12 and is provided at both ends with a calotte-like or skullcap-like end cap 14. A valve 18 is provided in the direction of the outflow line 16. At the opposite end of the pressure vessel 10, i.e. away from the valve 18, a pressure pipe 24 communicates with the interior of the vessel. This pressure pipe 24 joins up with a common pressure pipe 56, in the same way as the pressure pipes 24 from two pressure vessels 10 lying underneath and each of three other pressure vessels 10, not visible here but lying behind those indicated in FIG. 1. The cross-section of the common pressure pipe 56, in accordance with the connecting pressure pipes 24, increases in size in steps approaching a pneumatically controllable quick-acting venting valve 58. The venting valve has a large through-flow capacity; it allows the pressure vessels 10 to vent out their contents in a short time via a venting pipe 60.

The quick-acting venting valve 58, in the present case shown in the form of a ball valve with pneumatic control head, is held closed by a constant gas pressure of 6–8 bar in a low pressure pipe 62. If the pressure in the low pressure pipe 62 +, which is filled with nitrogen-falls below 3 bar, then the venting valve 58 opens and all the pressure vessels 10 empty themselves via the pressure pipes 24 and the common pressure pipe 56.

The low pressure pipe 62 branches in such a manner that a pipe runs below each pressure vessel 10 along the axial direction A of the same. In the region of the pressure vessel ends, and about one third from each end along the length 1, spaced a distance a apart, T-shaped fittings 26 are provided in the low pressure pipe 62. A fitting 26 is shown in detail in FIG. 1A. The flange 28 of the T-shaped fitting 26 projecting vertically from the low pressure pipe 62 contains a melting plug 22 of Wood's metal that melts at about 100° C. The T-shaped fitting at the end is closed by at least one melting plug 22.

The pressure vessels 10, of length of about 6 m, are also protected in the mid-length region should a fire break out there. The melting plug 22 in at least one T-shaped fitting melts and the nitrogen in the low pressure pipe 62 flows out; as a result of the drop in pressure the pneumatic quick-acting venting valve 58 opens within seconds. The, normally combustible, gas stored in the pressure vessel 10 escapes via venting pipe 60 to a region which is completely out of danger with respect to further development of the fire.

The pipelines 64, indicated by broken lines, indicate that all pressure vessels 10 can be emptied under normal conditions of use via a common pipe 16.

FIG. 2 shows a melting plug 22 that is known per se, screwed into a steel or brass sleeve 30 with inner 31, and outer 32 threads and hexagonal bolt head 34.

FIG. 3 shows the principle of pressure vessels 10 on a tube-trailer with low pressure pipes 62. The low pressure pipes 62 for the lowest lying pressure vessels 10 are situated directly below the pressure vessels. They can also run between them. Above the lowest set of pressure vessels 10 the low pressure pipes 62 are in each case situated in the intervening spaces.

All the low pressure pipes 62 are interconnected. If a melting plug 22 (FIG. 1A) in any one low pressure pipe 62 melts, the nitrogen in the low pressure pipes 62 escapes. The pressure drops, and the quick-acting venting valve 58 (FIG. 1) opens. The gas can then escape via the pressure pipes not shown here.

FIG. 4 shows a perspective view of a 4 m long cylindrical pressure vessel 10 for methane. It corresponds essentially to the pressure vessel shown in FIG. 1. The pressure pipe 24 leads, however, directly to the venting valve 58 which is held closed by the pressure of 6–8 bar in the low pressure pipe 62. A drop in pressure in the low pressure pipe 62 opens the venting valve 58, the methane escapes in the direction of the arrow 66 to a region out of danger of the fire.

The low pressure pipe 62 runs in the axial direction below the pressure vessel 10 and is held in place there by collars 68. The short length of 4 m necessitates only three T-shaped fittings 26 with a melting plug; these are built in to the low pressure pipe 62 in the region of the pressure vessel ends and at the mid-length position of the pressure vessel 10.

The low pressure pipe 62 is connected to the compressed air system of the vehicle, + characterized here by a low pressure container 70. The connection of the compressed air system to the low pressure pipe 62 is made via a capillary 72. As a result, therefore, also in the case that a small leak should occur, the low pressure pipe 62 can always be held at an operating pressure of 6–8 bar. If a melting plug 22 (FIG. 1A) should melt, then only a very small amount of air escapes into the vicinity of the fire.

According to a version not shown here, instead of the compressed air system an opened low-pressure container 70 of nitrogen can be connected to the low pressure pipe 62. In that case the capillary 72 is not required, as the low pressure gas is inert with respect to fire.

Shown perspectively in FIG. 5 is a 12 m long cylindrically shaped pressure vessel 10 for natural gas. In principle it corresponds to the pressure vessel in FIG. 1. The pressure pipe 24 leads directly to a fast-acting venting valve 58 which is shown here as an electric servo-valve.

Below the pressure vessel 10 are nine, uniformly spaced, thermosensors 74 that are connected via at least one pair of heat resistant electrically conductive wires 75 to a relay 76. If a thermosensor 74 is heated to exceed a critical temperature of about 100° C., this actuates a relay switch 78 which closes an electric circuit 82 leading from a battery 80 to the venting valve 58. The current supplied by the battery enables the electric servo-valve, which is closed off by the force of a spring, to be opened.

The battery 80 can be the battery of the vehicle, in which case the electric circuit 82, however, must not include any other circuit breaker than the relay switch 78.

According to another version that is not illustrated here the electrical conductors 75 are wound spirally round the pressure vessel 10. The thermosensors 74 in that case are arranged at about the same places as shown in FIG. 5.

What is claimed is:

1. Protective device for protecting pressure vessels of at least 1,5 m in length against overheating, which comprises: at least one pressure vessel having an axial direction for the storage and/or transportation of high pressure gases, said pressure vessel being essentially cylindrical with two end caps, a first of which including a valve thereon, a pressure pipe communicating with the interior of the pressure vessel and branching off from the second end cap; a venting valve that can be regulated communicating with the pressure pipe and situated away from the pressure vessel and in its normal setting closing off the pressure pipe; a venting pipe communicating with the venting valve that terminates away from the region of the pressure vessel; and temperature-sensitive actuating means spaced a distance apart along a means running in the axial direction of the pressure vessel and connected to the venting valve, said actuating means being such that each individual actuating means, if overheated, will actuate the venting valve wherein the actuating means are situated in the region of the ends of the pressure vessel and at a regular spacing along the axial direction of the pressure vessel, and permit pressure to escape from said pressure vessel via said pressure pipe.

2. Device according to claim 1 including a common pressure pipe communicating with said venting pipe and pressure pipe, wherein said venting valve closes off the common pressure pipe.

3. Device according to claim 1 in which the actuating means are situated along the axial direction of the pressure vessel at a regular spacing of 1-2 m.

4. Device according to claim 3 wherein said spacing is 1.5 m.

5. Device according to claim 1 including a plurality of said vessels.

6. Device according to claim 2 in which in a battery of pressure vessels the pressure pipes of a plurality of pressure vessels join up with the common pressure pipe, and including a plurality of actuating means along a plurality of pipe means running in the axial direction of each pressure vessel, wherein said venting valve can be actuated by each of the actuating means, and wherein said common pressure pipe has a larger internal cross-section than that of a single pressure pipe.

7. Device according to claim 6 wherein at least some of the actuating means for opening the venting valve are arranged between the pressure vessels in the axial direction.

8. Device according to claim 1 wherein the temperature-sensitive actuating means comprises at least one low pressure pipe running in the axial direction and featuring in-built essentially T-shaped fittings with a projecting flange that are spaced apart and have in their projecting flange a melting plug of a metal that melts at a low temperature, wherein the low pressure pipe is closed at one end and is connected to a pneumatic venting valve which it keeps closed under normal conditions.

9. Device according to claim 8 in which the end of the low pressure pipe that is not connected to the venting valve is connected to a means at a pressure of 5-8 bar.

10. Device according to claim 9 wherein the end of the low pressure pipe not connected to the venting valve is connected to said pressure means via a reduced pipe cross-section.

11. Device according to claim 1 in which the temperature-sensitive actuating means comprises at least one pair of heat resistant electrically conductive wires with thermosensors that are spaced out in the axial direction and emit an electrical signal at a given temperature, said thermosensors being connected to the venting valve, wherein the venting valve is in the form of a valve which is closed under normal conditions.

12. Device according to claim 11 in which built into the electric connection between a thermosensor and venting valve is a relay switch which, on receiving a signal, switches in the current that causes the venting valve to open, the relay switch closing an electric circuit, that cannot otherwise be interrupted, via a battery.

13. Device according to claim 11 in which the electrically conductive wires with the thermosensors are arranged parallel to the axial direction of the pressure vessel.

14. Device according to claim 8 wherein the melting plug melts at 80°-120° C.

15. Device according to claim 11 wherein the thermosensor produces an electric signal at 80°-120° C.

16. Device according to claim 1 wherein the pressure vessel is of aluminum.

17. Device according to claim 16 wherein the pressure vessel has fiber-reinforced jacketing.

18. Device according to claim 16 including batteries of said pressure vessels on tube-trailers.

19. Device according to claim 1 wherein said temperature-sensitive actuating means includes a pipe means.

* * * * *

UNITED STATES PATENT AND TRADEMARK OFFICE
CERTIFICATE OF CORRECTION

PATENT NO. : 5,042,520
DATED : August 27, 1991
INVENTOR(S) : ISRAEL REZNIK

It is certified that error appears in the above-identified patent and that said Letters Patent is hereby corrected as shown below:

On the Cover page, the filing date should read --June 4, 1990--.

In the Abstract, line 13, after "means are" delete "provdied" and insert --provided--.

In the Abstract, line 14, before "of the pressure" delete "direciton" and insert --direction--.

In Column 3, line 32, after "but," delete the "+" and after "safety measures," delete the "*".

In Column 3, line 51, after "valve," delete the "+".

In Column 3, line 53, before "opens the" delete the "+".

In Column 5, line 33, after "pipe 62" delete the "+".

In Column 6, line 27, after "vehicle," delete the "+".

Signed and Sealed this

Ninth Day of February, 1993

Attest:

STEPHEN G. KUNIN

Attesting Officer

Acting Commissioner of Patents and Trademarks